Patented Dec. 3, 1929

1,737,792

UNITED STATES PATENT OFFICE

FRITZ GÜNTHER AND JOSEF HETZER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF ALKYLATED AROMATIC SULPHONIC ACIDS

No Drawing. Application filed January 28, 1926, Serial No. 84,502, and in Germany January 30, 1925.

We have found that saturated normal primary butyl alcohol can be condensed with aromatic sulphonic acids with or without the aid of condensing agents, as for example sulphuric acid. The new sulphonic acids thus obtained contain one or several butyl residues in their nucleus. The condensation may also be carried out with the salts of aromatic sulphonic acids instead of the free acids and normal primary butyl alcohol in which case, however, the presence of a condensing agent is necessary. The same or similar products are obtained when unsulphonated aromatic hydrocarbons are treated with the said alcohol in the presence of sulphuric acid, or other condensing agents and subsequently, or when employing sulphuric acid, simultaneously sulphonating.

Our invention is further illustrated by the following examples to which, however, the invention is not limited. The parts are by weight.

Example 1

256 parts of naphthalene are transformed into beta-naphthalene-sulphonic acid by means of 256 parts of concentrated sulphuric acid in the usual manner. The temperature is then lowered to about 120 degrees centigrade, whereupon 600 parts of concentrated sulphuric acid are added. In the course of 2 hours, 300 parts of normal primary butyl alcohol are added to this mixture at about 100 degrees centigrade while vigorously stirring. The reaction which proceeds in accordance with the equation (assuming as an example the introduction of two butyl radicals)

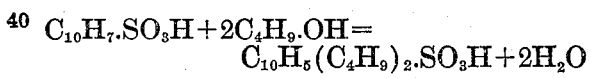

$$C_{10}H_7.SO_3H + 2C_4H_9.OH = C_{10}H_5(C_4H_9)_2.SO_3H + 2H_2O$$

is completed by maintaining the mass at the same temperature for several hours. The stirring is then stopped, whereupon the mass separates into two layers. The upper layer which consists chiefly of butylated naphthalene sulphonic acid, is separated, and, if desired, neutralized by means of alkali. By evaporating or salting out, the butylated naphthalene sulphonic acid sodium salt is obtained in the solid state.

Example 2

156 parts of benzene are transformed into benzene sulphonic acid by means of 362 parts of sulphuric acid of 67 degrees Baumé at about 100 degrees centigrade. While stirring, a mixture of 412 parts of sulphuric acid of 67 degrees Baumé and 296 parts of normal primary butyl alcohol is introduced into the mixture of benzene sulphonic acid and sulphuric acid in the course of about 3 to 4 hours. The reaction is completed by maintaining the same temperature for several hours while stirring. The reaction product is then treated with lime whereby the calcium salt of the butylated benzene sulphonic acid is obtained which may be transformed into the sodium salt by means of sodium carbonate. The sodium salt has excellent wetting properties.

Example 3

184 parts of toluene are converted into toluene sulphonic acid by heating with 390 parts of sulphuric acid of 67 degrees Baumé to 110 to 115 degrees centigrade for several hours. The temperature is then lowered to about 100 degrees centigrade, whereupon a mixture of 412 parts of sulphuric acid of 67 degrees Baumé and 296 parts of normal primary butyl alcohol is slowly introduced while vigorously stirring. The condensation is completed by heating the mass to 100 to 105 degrees centigrade for about 4 to 5 hours. The butylated toluene sulphonic acid may be isolated as described in Example 2. Its sodium salt is capable of easily wetting and producing lather.

Example 4

A mixture of 128 parts of naphthalene, 148 parts of normal primary butyl alcohol and 400 parts of sulphuric acid of 66 degrees Baumé is gradually heated to about 120 degrees centigrade in the course of 4 to 5 hours while vigorously stirring. The said temperature is maintained until a test portion is soluble in water. The product may be worked up either by preparing the calcium salt of the butylated naphthalene sulphonic acid in the manner described in Example 2 and transforming the calcium salt so obtained into the sodium salt by means of sodium carbonate or by separating the upper layer formed when the reaction product is cooled and isolating therefrom the free sulphonic acid or its salts in the manner described in Example 1.

We claim:

1. The process of manufacturing naphthalene sulphonic acids containing alkyl groups in their nucleus which consists in acting on a naphthalene sulphonic acid with normal primary butyl alcohol in the presence of sulphuric acid.

2. As new articles of manufacture, aromatic sulphonic acids having condensed nuclei and containing butyl groups in their nucleus.

3. As new articles of manufacture, aromatic sulphonic acid salts having condensed nuclei and containing butyl groups in their nucleus.

In testimony whereof we have hereunto set our hands.

FRITZ GÜNTHER.
JOSEF HETZER.